United States Patent [19]

Ridenour

[11] Patent Number: 5,702,718
[45] Date of Patent: Dec. 30, 1997

[54] METHOD FOR APPLYING METAL-AMINO ACID COMPLEXES AS SUPPLEMENTS TO FEED

[75] Inventor: Ken W. Ridenour, Amurillo, Tex.

[73] Assignee: K.E.R. Associates, Inc., Tex.

[21] Appl. No.: 507,663

[22] Filed: Jul. 25, 1995

[51] Int. Cl.$^6$ ...................................... A23K 1/18
[52] U.S. Cl. ............................ 424/438; 426/807
[58] Field of Search ................ 424/438; 426/807

[56] References Cited

U.S. PATENT DOCUMENTS

| | | | |
|---|---|---|---|
| 3,463,858 | 8/1969 | Anderson | 424/289 |
| 3,925,433 | 12/1975 | Abdel-Monem et al. | 260/438.5 R |
| 3,941,818 | 3/1976 | Abdel-Monem | 260/429.9 |
| 3,950,372 | 4/1976 | Abdel-Monem | 260/429 R |
| 4,021,569 | 5/1977 | Abdel-Monem | 424/289 |
| 4,039,681 | 8/1977 | Abdel-Monem | 424/289 |
| 4,067,994 | 1/1978 | Anderson et al. | 424/295 |
| 4,670,269 | 6/1987 | Abdel-Monem | 426/74 |
| 4,678,854 | 7/1987 | Abdel-Monem | 556/149 |
| 4,764,633 | 8/1988 | Anderson et al. | 556/50 |
| 4,900,561 | 2/1990 | Abdel-Monem et al. | 426/2 |
| 4,956,188 | 9/1990 | Anderson | 426/74 |
| 5,229,118 | 7/1993 | Campbell | 424/195.1 |

*Primary Examiner*—D. Gabrielle Phelan
*Attorney, Agent, or Firm*—Arnold, White & Durkee

[57] ABSTRACT

There is disclosed a method useful for applying feed supplements to feed, comprising: preparing an aqueous composition containing a metal-amino acid complex, such as zinc methionine, and directly applying the aqueous composition to the feed at a local manufacturing or feeding site. The method may further comprise transporting the aqueous composition to a feeding site after being prepared and before being applied onto the feed.

9 Claims, No Drawings

METHOD FOR APPLYING METAL-AMINO ACID COMPLEXES AS SUPPLEMENTS TO FEED

BACKGROUND OF THE INVENTION

This invention relates to a method for providing nutritional supplements to livestock. More particularly, this invention relates to a method for providing metal-amino acid complexes such as zinc methionine supplements to livestock feed by applying an aqueous composition of the metal-amino acid complex to livestock feed at the local feed manufacturing or feeding site.

Food supplements including nutritional supplements for cattle and other livestock are well known. For example, U.S. Pat. Nos. 3,463,858; 3,925,433; 3,941,818; 3,950,372; 4,021,569; 4,067,994; 4,670,269; 4,678,854; 4,764,633; 4,900,561 and 4,956,188 disclose the use of a variety of metal salts for use as nutritional supplements. For example, U.S. Pat. No. 4,021,569 discloses the use of zinc methionine as a supplement. Generally, these supplements are provided to livestock by preparing an aqueous solution of the metal-amino acid complex, applying the aqueous solution to a carrier, drying the carrier, packaging the carrier, and transporting the carrier to a distributor and mixer who then provides it to the customers at the local feed manufacturing site or feeding site such as a feedlot. Alternatively, the metal-amino acid complex is isolated by concentrating the aqueous solution as by drying, with the concentrate being transported to the local site where it is diluted then applied to cable feed. Both of these operations require a drying step which is energy intensive. It would be advantageous to eliminate this drying step.

SUMMARY OF THE INVENTION

It has now been found that an aqueous composition containing a metal-amino acid complex feed supplement can be prepared, transported to the local site and applied directly on livestock feed, thereby eliminating the drying step referred to above.

In one broad respect, the present invention is a method useful for applying nutritional supplements to feed, comprising: preparing an aqueous composition containing a metal-amino acid complex; and applying the aqueous composition to the feed at a local site. This local site can be the site of manufacture of the final feed product or the feeding site such as a feed lot. This method may further comprise transporting the aqueous composition to the local livestock feed manufacturing or feeding site after being prepared and before being applied onto the feed.

Advantageously, the present invention eliminates the need for drying the aqueous composition. Advantageously, the present invention can be practiced in the absence of applying the aqueous composition to a carrier to be transported to the livestock operation. Thus, in the practice of the present invention, the need for a carrier is eliminated. Furthermore, no drying step is necessary and no bagging of the carrier is required in the practice of this invention. The aqueous composition containing the metal-amino acid complex can be applied to a variety of feeds including feeds for livestock such as cattle.

DETAILED DESCRIPTION OF THE PREFERRED EMBODIMENTS

The above described method employs well known metal-amino acid complexes which are commonly used as nutritional supplements for feed that is to be fed to a variety of livestock animals. Such metal-amino acid complexes and methods of preparation thereof are as described in U.S. Pat. Nos. 3,463,858; 3,925,433; 3,941,818; 3,950,372; 4,021,569; 4,067,994; 4,670,269; 4,678,854; 4,764,633; 4,900,561 and 4,956,188, incorporated herein by reference. Representative examples of such alpha amino acids include lysine, arginine, cysteine, tryptophane, leucine, isoleucine, methionine and other beta amino acids. In the practice of this invention, methionine is the more preferred amino acid. The metals may vary, but are generally selected from zinc, cobalt, manganese, chromium, copper and selenium. In the practice of this invention, zinc is the preferred metal. The preferred metal-amino acid complex is zinc methionine.

As described in the above referenced U.S. Patents, the metal-amino acid complex may be prepared by admixing metal salts such as metal sulfates with a source of amino acid in warm water (e.g., from about 60 to about 70 degrees Centigrade). Sources of amino acids include amino acids per se as well as from feed grains, fermentation residue, animal meal, distillers molasses solubles, whey, yeast products, fish solubles, feather meal, distillers grains, corn gluten feed, brewers dried grains, peanut oil meal, milk by-products, oil seed residue and casein. The amounts of metal and amino acid may vary as is apparent to one of skill in the art. Generally, the metal and amino acid are added in amounts such that the metal complex formed has a ratio of metal to amino acid of about a 1:1. The preparation of such metal complex can be conducted in a variety of apparatus well known in the art designed for such purpose. Generally, such apparatus are equipped with heaters and stirrers. The concentration, expressed as a weight ratio of complex to water, of metal-amino acid complex in the aqueous composition may vary, but is generally less than about 1:1 and is commonly in the range from about 1:1 to about 1:4. In other words, the complex comprises from about 20 weight percent to about 60 weight percent of the aqueous composition.

After preparation of the metal-amino acid complex aqueous composition, the composition may be transported directly to the local site where the composition is applied to the feed. The composition may be transported by a variety of methods including, but not limited to, storing the composition in a sealed container on a vehicle equipped with a device designed to spray or otherwise apply the composition on the feed. For example, a tank car equipped with a hose, spray nozzle and pump may be employed. The amount of composition applied to feed may vary depending on the concentration of metal-amino acid complex in the composition, with the amounts commonly used being well known to those of skill in the art, as described in the aforementioned U.S. Patents, incorporated herein by reference.

The feed to be treated in accordance with this invention may vary widely. Such feed may vary depending on, for instance, the type of animal that is to be fed. For example, this invention may be practiced in order to apply the aqueous composition to cattle feed. In the practice of this invention, the composition is not applied to carriers per se such as corn cob fractions, rice hulls, wheat midds, sawdust and peanut hulls, with the resulting mixture dried and then shipped to a distributor, premixer and then to the local site. Such carriers are recognized to one of skill in the art as lacking nutritional value; that is, lacking an adequate amount of nutrients. Instead, in the practice of this invention, the composition is applied directly to feed for livestock such as cattle, sheep, horses, swine, poultry and so forth, and especially for cattle. While such carriers may be present in the feed, it is an important attribute of this invention that the composition be applied to the feed, and not the carrier in the absence of feed.

What is claimed is:

1. A method for applying feed supplements to feed, comprising: preparing an aqueous composition containing a metal-amino acid complex and applying the aqueous composition to the feed at a local site wherein the method does not include the step of applying said aqueous composition onto a carrier, thereby eliminating the steps of drying a carrier and packaging a carrier before transporting the aqueous composition to the local site.

2. The method of claim 1 wherein the aqueous composition contains less than about 60 weight percent of the metal-amino acid complex.

3. The method of claim 1 wherein the metal of the metal-amino acid complex is zinc, cobalt, manganese, chromium, copper or selenium.

4. The method of claim 3 wherein the amino acid is an alpha amino acid or a beta amino acid.

5. The method of claim 1 wherein the metal-amino acid complex is zinc methionine.

6. The method of claim 1 wherein the metal-amino acid complex is a zinc-amino acid complex.

7. The method of claim 1 further comprising transporting the aqueous composition to a local site after being prepared and before being applied onto the feed.

8. The method of claim 1 wherein the aqueous composition is applied to the feed by spraying.

9. A method for directly applying feed supplements to livestock feed at a local site, comprising: preparing an aqueous composition containing zinc methionine; transporting the aqueous composition to the site after being prepared and before being applied onto the feed; and directly applying the aqueous composition to the feed at the local site.

* * * * *

UNITED STATES PATENT AND TRADEMARK OFFICE
CERTIFICATE OF CORRECTION

PATENT NO.    :   5,702,718

DATED         :   December 30, 1997

INVENTOR(S)   :   Ken W. Ridenour

It is certified that error appears in the above-identified patent and that said Letters Patent is hereby corrected as shown below:

In the title page, item [73], line 1, after 'Inc.,' insert --Amarillo,--.

Signed and Sealed this

Twenty-fourth Day of March, 1998

Attest:

BRUCE LEHMAN

*Attesting Officer*           *Commissioner of Patents and Trademarks*